Patented Sept. 26, 1944

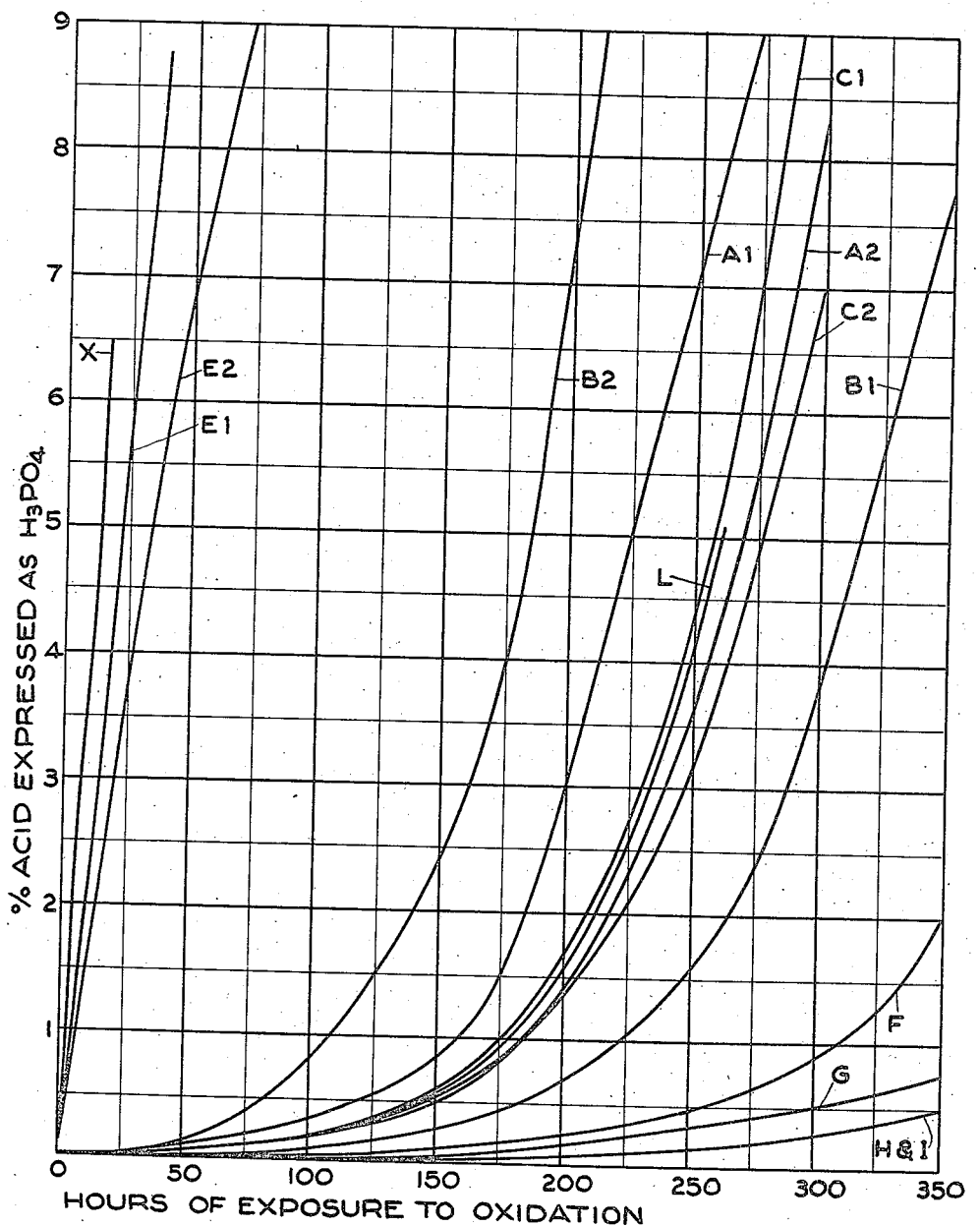

2,359,243

UNITED STATES PATENT OFFICE 2,359,243

TREATMENT OF PHOSPHORUS

John C. Pernert, Niagara Falls, N. Y., assignor to Oldbury Electro-Chemical Co., Niagara Falls, N. Y.

Application August 13, 1943, Serial No. 498,586

12 Claims. (Cl. 23—223)

This invention relates to the treatment of so called "red" or amorphous phosphorus for the purpose of increasing stability thereof against oxidation. The terms "red phosphorus" and "amorphous phosphorus" used herein refer to the allotropic modification of phosphorus thus designated in the trade and in chemical dictionaries and text books. Heretofore red phosphorus has been treated by precipitating or mixing alumina with the phosphorus with a view to reducing the rate of subsequent oxidation of the phosphorus, as when being shipped or stored in bulk; and while such methods have been found to retard the rate of phosphorus oxidation, undesirably large amounts of alumina must be so employed to produce an adequate degree of stability against oxidation. That is, if alumina is so used in quantities sufficient to stabilize the phosphorus to a satisfactory degree, the product becomes so contaminated thereby as to be unsuited for the purpose intended; and if lesser quantities of alumina are employed the product will remain so susceptible to oxidation as to deteriorate rapidly unless protected against access of air during shipping and storage processes, preliminary to its intended use.

It is the primary object of the present invention to provide a simple and economical and otherwise improved treatment for raw red phosphorus; which treatment will effectively increase the stability thereof against the normal tendency to oxidize, whereby during a given period of time much lower percentages of the product will oxidize to form acids of phosphorus, other conditions being the same. Another object of the invention is to provide a phosphorus treating method of the character referred to which will not result in undesirable contamination of the product. Other objects and advantages of the invention will appear in the specification hereinafter.

In the drawing the figure is a graphical illustration of rates of oxidation of phosphorus treated by various methods, under similar oxidizing influences, to demonstrate the results of the invention.

The following are examples of preferred methods of pursuing the present invention, although some departures therefrom may be made without sacrificing all the attainable advantages. Stated generally, the preferred form of the invention comprises treating red phosphorus by mixing it with a solution of soluble aluminate and aerating the mixture for several hours. In many cases superior results are attained when the mixture is heated during the aeration process.

I have determined that any soluble aluminate of the alkali metals may be employed for the purpose of the invention, such as sodium aluminate or potassium aluminate; and the following are examples of three substantially equivalent methods of obtaining suitable sodium aluminate solutions for use in treating amorphous or red phosphorus to stabilize the same.

SOLUTION A

For the purpose referred to the solution may be prepared by combining aluminum sulfate and sodium hydroxide in combining proportions. To 200 ccs. of normal sodium hydroxide there may be added a slight excess of ammonium aluminum sulfate until a slight permanent precipitate is formed. This solution may be diluted to one liter, which is equivalent to 0.04 normal (four hundredths normal) solution of sodium aluminate, and filtered. Instead of filtering, the solution may be merely permitted to settle for several hours whereupon the supernatant liquid may be decanted; or the solution may be used without any clarification since a moderate amount of undissolved alumina in this form will do no harm. The preparation of this solution will require about 19 grams of aluminum ammonium sulfate and from this it may be calculated that the probable reaction is expressed in the following equation:

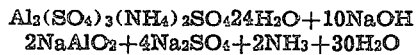

$$Al_2(SO_4)_3(NH_4)_2SO_424H_2O + 10NaOH$$
$$2NaAlO_2 + 4Na_2SO_4 + 2NH_3 + 30H_2O$$

SOLUTION B

Aluminum hydroxide may be prepared by reacting aluminum sulfate and sodium hydroxide, and the alumina filtered off and used to saturate one-tenth normal sodium hydroxide. The excess alumina may be filtered from the solution and the clear filtrate used as outlined below.

SOLUTION C

This solution may be prepared by merely dissolving 10 grams of commercially pure sodium aluminate in 1 liter of water. This solution likewise may be filtered; although the solution may be used without filtration if desired.

To demonstrate the invention the foregoing solutions were used to treat in each case two duplicate samples of amorphous or red phosphorus, and the treatment was identical in each case save for the use of the differently prepared sodium aluminate solutions. In each case 250 grams of finely ground red phosphorus containing about 20% moisture was mixed with 500 ccs. of the solution. The mixture was agitated by passing a stream of air through a glass tube at the rate of about 5 liters per hour. The mixture was heated to between 85 and 90° C. After heating and aerating for 10 hours the phosphorus was removed by filtration on a Buechner funnel, washed with hot water, and dried under reduced pressure over calcium chloride. The two samples treated with Solution A are designated A1 and A2; those treated with Solution B, B1 and B2; and those treated with Solution C, C1 and C2.

Each of the six samples were exposed to air at controlled temperature and humidity. The temperature was 60° C. and the humidity was that of a saturated solution of sodium chloride at 60° C. These conditions were chosen to accelerate oxidation and accordingly shorten the required test periods. At regular intervals the acid was extracted from weighed portions of each sample with water and the acid so extracted was titrated with one-tenth normal sodium hydroxide and the percentage of acid (calculated as $H_3PO_4$) is shown in the accompanying drawing wherein the curves of the six samples here referred to are identified. The following table gives the acidity of the several samples after the lapse of various periods of time.

*Acidity calculated as $H_3PO_4$*

| Sample | Initial Per cent | After 47 hrs. Per cent | 160 hrs. Per cent | 250 hrs. Per cent | 300 hrs. Per cent | 350 hrs. Per cent |
|---|---|---|---|---|---|---|
| A1 | 0.05 | 0.12 | 0.99 | 7.0 |  | 16.3 |
| A2 | 0.08 | 0.11 | 0.60 | 3.5 | 8.2 |  |
| B1 | 0.03 | 0.06 | 0.34 | 1.55 |  | 7.6 |
| B2 | 0.02 | 0.12 | 2.90 | 14.8 | 20.5 |  |
| C1 | 0.04 | 0.10 | 0.74 | 4.2 |  | 15.8 |
| C2 | 0.03 | 0.09 | 0.66 | 3.2 | 7.0 |  |

The following additional examples of treatments intended to provide stabilizing effects were conducted in the laboratory for comparison purposes:

100 grams of red phosphorus was boiled for 10 hours with 175 ccs. of sodium carbonate in a one-tenth normal solution. This method was likewise carried on in duplicate and in one case titration of 100 ccs. of the solution with 33.5 ccs. of one-tenth normal acid took the solution to methyl orange showing that two-thirds of the sodium carbonate had been neutralized. In the other of these duplicate method examples 36.0 ccs. of acid were required to titrate 100 ccs. of the solution to the same degree. These methods may be designated E1 and E2. In both cases the amorphous phosphorus was filtered off and suspended in a solution containing 100 ccs. of one-tenth normal sodium carbonate and 150 ccs. of water. The suspension was heated to between 80 and 90° C., 50 ccs. of a 1% ammonium aluminum sulfate solution was added, and the whole boiled for 6 hours. The phosphorus was then filtered off, washed, and dried in vacuo over calcium chloride. The degree of oxidation of phosphorus so treated over a period of time is indicated by the curves E1 and E2 of the drawing.

Curve F of the chart indicates the results obtained by making the 1% solution of pure sodium aluminate by dissolving 10 grams thereof in water and diluting it to one liter. The solution was slightly turbid but was not filtered. 250 cc. of the solution was mixed with 125 grams of moist red phosphorus containing about 20% of water. The water contained in the moist phosphorus was sufficient to dilute the solution to slightly over tenth normal. The mixture was vigorously aerated for 18 hours, at a temperature range between 20–25° C.

Curve G indicates the results obtained by preparing a mixture as described in connection with curve F, except that after removing about 40 grams of the phosphorus mixture aeration was continued for another 22 hours, making about 40 hours in all.

Curve H indicates the results obtained while working with a mixture prepared as in connection with curve F, except that the temperature was maintained in the region of 40° C., and the aeration period was approximately 10 hours.

Curve I indicates the results obtained when working with mixtures as described in connection with curve H, except that the temperature was maintained at about 60° C.

Curve X indicates the results obtained when working with a mixture as in connection with curve F, but without aeration. The time of treatment was approximately 72 hours.

In a further example, 8 grams of ammonium alum were added to a liter of one-tenth normal potassium hydroxide, and 250 grams of red or amorphous phosphorus was placed in 500 cc. of the resulting solution. The whole was aerated as before for 10 hours at 60° centigrade. Curve L shows the reaction of phosphorus so treated to accelerated oxidation conditions.

To further test the efficacy of the invention samples corresponding to samples A1; A2; B1; B2; C1 and C2 were exposed to air for a period of several months under conditions tending to produce only normal oxidation rates. The average temperature at the time was around 21° C. The humidity was such as to represent a typical storage condition. At the end of 290 days the acidities were as follows:

|  | Per cent |
|---|---|
| A1 | 1½ |
| A2 | 1 |
| B1 | .05 |
| B2 | .06 |
| C1 | .02 |
| C2 | .05 |

Red phosphorus untreated in accord with the present invention and stored under the same conditions contained at the end of

|  | Per cent Acidity |
|---|---|
| 17 days | 1 |
| 26 days | 2 |
| 35 days | 3 |
| 60 days | 5.75 |
| 80 days | 8 |

It is clearly possible to conclude from the results listed hereinabove that the combination of treatment with a soluble aluminate and aeration produces marked increase of stabilization of the phosphorus against oxidation. It is, of course, to be understood that the term "aeration" refers to admixture of air into the phosphorus-aluminate mixture, such as may be accomplished either by blowing air therethrough, or by simply stirring the mixture in an atmosphere of air, or by any other suitable method.

I claim:

1. A method of treating red phosphorus which comprises preparing a solution of sodium aluminate in water, mixing red phosphorus therein, aerating the same for at least several hours, removing the phosphorus from the solution, and drying the same.

2. A method of treating red phosphorus which comprises preparing a solution of sodium aluminate in water, mixing red phosphorus therein, aerating the same for at least five hours, removing the phosphorus from the solution, and drying the same.

3. A method of treating red phosphorus which comprises preparing a solution of sodium aluminate in water, mixing red phosphorus therein, heating and aerating the mixture at least five hours, removing the phosphorus from the solution, and drying the same.

4. A method of treating red phosphorus which comprises preparing a solution of sodium aluminate in water, mixing red phosphorus therein, and aerating the mixture for a time sufficient to stabilize the phosphorus to a materially reduced rate of oxidation.

5. A method of treating red phosphorus which comprises preparing a solution of potassium aluminate in water, mixing red phosphorus therein, aerating the mixture for at least several hours, removing the phosphorus from the solution, and drying the same.

6. A method of treating red phosphorus which comprises preparing a solution of potassium aluminate in water, mixing red phosphorus therein, aerating the mixture for at least five hours, removing the phosphorus from the solution, and drying the same.

7. A method of treating red phosphorus which comprises mixing it into a solution of potassium aluminate and aerating the mixture.

8. A method of treating red phosphorus which comprises preparing a solution of potassium aluminate in water, mixing red phosphorus therein, aerating the mixture for a time sufficient to stabilize the phosphorus to a materially reduced rate of oxidation, removing the phosphorus from the solution, and drying the same.

9. A method of treating red phosphorus which comprises preparing a solution of potassium aluminate in water, mixing red phosphorus therein, heating and aerating the mixture, removing the phosphorus from the solution, and drying the same.

10. A method of treating red phosphorus which comprises mixing it in a solution of sodium aluminate, heating and aerating the mixture, removing the phosphorus from the mixture, and drying the same.

11. A method of treating red phosphorus to increase stabilization thereof against oxidation, which method comprises mixing red phosphorus in a solution of soluble aluminate, and aerating the mixture.

12. A method of treating red phosphorus to increase stabilization thereof against oxidation, which method comprises mixing a solution of alkali metal aluminate with the phosphorus, and aerating the mixture.

JOHN C. PERNERT.